(12) United States Patent
Yokoyama

(10) Patent No.: US 7,686,398 B2
(45) Date of Patent: Mar. 30, 2010

(54) SEAT APPARATUS FOR VEHICLE

(75) Inventor: Takashi Yokoyama, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/253,612

(22) Filed: Oct. 17, 2008

(65) Prior Publication Data
US 2009/0108655 A1 Apr. 30, 2009

(30) Foreign Application Priority Data
Oct. 30, 2007 (JP) ............... 2007-281730

(51) Int. Cl.
B60N 2/02 (2006.01)
(52) U.S. Cl. .................. 297/341; 297/378.12
(58) Field of Classification Search .......... 297/341, 297/378.12
See application file for complete search history.

(56) References Cited

U.S. PATENT DOCUMENTS

| 5,531,503 A * | 7/1996 | Hughes ................ 297/341 |
| 6,986,551 B2 * | 1/2006 | Ohba .................. 297/341 |
| 2003/0127898 A1 | 7/2003 | Niimi et al. |
| 2004/0021355 A1 | 2/2004 | Ohba |

FOREIGN PATENT DOCUMENTS

| EP | 1 388 458 A2 | 2/2004 |
| FR | 2 833 897 | 6/2003 |
| JP | 6-27297 | 4/1994 |
| JP | 2004-243864 | 9/2004 |
| WO | WO 99/38723 | 8/1999 |

* cited by examiner

Primary Examiner—Milton Nelson, Jr.
(74) Attorney, Agent, or Firm—Oblon, Spivak, McClelland, Maier & Neustadt, L.L.P

(57) ABSTRACT

A seat apparatus for a vehicle includes a first engagement member moving in association with an upper arm, a second engagement member pivotally moved between a first position and a second position for pivotally moving the upper arm from a first pivot position to a second pivot position and retaining the upper arm at the second position by an engagement between the first engagement member and an engagement portion of the second engagement member, and a tilting mechanism releasing a lock of a reclining mechanism for pivotally moving the upper arm to a third pivot position. The seat apparatus further includes a retaining mechanism provided at the second engagement member for retaining the second engagement member at the first position against a biasing force of a biasing mechanism for biasing the second engagement member in a direction from the first position to the second position.

7 Claims, 8 Drawing Sheets

SEAT APPARATUS FOR VEHICLE

CROSS REFERENCE TO RELATED APPLICATIONS

This application is based on and claims priority under 35 U.S.C. §119 to Japanese Patent Application 2007-281730, filed on Oct. 30, 2007, the entire content of which is incorporated herein by reference.

FIELD OF THE INVENTION

The present invention generally relates to a seat apparatus for a vehicle.

BACKGROUND

Conventionally in a vehicle such as a van having box-shaped body, a space for occupants and a space for luggage are made of a common space. Therefore, a rear seat(s) is designed to change positions, i.e., from a seating position for enabling an occupant to be seated thereon to a walk-in position at which a seatback is forwardly tilted for enabling an occupant to enter a rear space of the vehicle, or to a tilt-down position where the seatback is forwardly tilted (folded) to be substantially horizontal when placing objects (such as luggage) on a back surface of the seatback. According to JP2004-243864A (hereinafter, referred to as reference 1), a seat apparatus includes a slide lock releasing means for releasing a locked state of a slide lock mechanism by a rotation of an operation lever located at a first position in a first direction and a reclining lock releasing means. The reclining lock releasing means releases a locked state of a reclining mechanism by the rotation of the operational lever located at a second position in the first direction. Thus, by operating one operation lever in different manner, a lock release of the seat slide mechanism, a lock release of the reclining mechanism and a retraction of the seat are performed.

Further, according to JPU1994-27297A (hereinafter, referred to as reference 2), a pin is locked by a hook of a locking member when forwardly tilting an upper arm of a seatback, and the upper arm is accordingly prevented from pivoting in a backward direction. Further, a lower end portion of a memory protrusion-detecting member is pressed upwardly by a memory protrusion when an upper rail of a seat apparatus slides. Therefore, a generated counterforce is received by a lower end portion of the locking member to pivot the locking member, thereby releasing the lock between the hook and the pin to allow the upper arm to pivot in the backward direction. Further, in cooperation with the backward pivoting movement of the upper rail, the upper rail is locked to a lower rail of the seat apparatus. Thus, even in a state where a vibration of the seat apparatus is severe, a slide lock mechanism is prevented from malfunctioning.

However, according to the references 1 and 2, a mechanism for performing both of an operation to move the seatback to the walk-in position and an operation to move the seatback to the tilt-down position is not disclosed. Further, when structuring a mechanism for performing both of the operations to move the seatback to the walk-in position and to the tilt-down position, an intermediate position lock portion is required to be provided between a seating position at which an occupant is able to be seated and the tilt-down position at which the seatback is reclined to be substantially horizontal, so that the seatback is locked to be retained at the walk-in position while pivotally moving towards the tilt-down position. However, in a condition where a manual operation for retaining the seatback is simultaneously performed when performing an operation of a lever for moving the seatback to the walk-in position, the intermediate position locking portion may fail to lock the seatback so that the seatback may be pivotally moved to the tilt-down position without being locked at the walk-in position. Thus, a malfunction of the seat apparatus may occur.

A need thus exists for a seat apparatus for a vehicle which is not susceptible to the drawback mentioned above.

SUMMARY OF THE INVENTION

According to an aspect of the present invention, a seat apparatus for a vehicle includes a slide lock mechanism, a first engagement member, a second engagement member, a tilting mechanism and a retaining mechanism. The slide lock mechanism is employed for locking and unlocking a relative movement between a lower rail adapted to be mounted on a vehicle to extend in a longitudinal direction of the vehicle and an upper rail slidably mounted on the lower rail. The first engagement member is provided at a lower end portion of an upper arm which is pivotably supported by a first end portion of a lower arm operatively connected to the upper rail so as to slide in association with the upper rail. The lower arm supports a seat cushion. The second engagement member is supported by the lower arm to be pivotably moved between a first position at which the first engagement member and the second engagement member are engaged with each other and a second position at which the second engagement member is separated from the first engagement member. The second engagement member is biased by a biasing mechanism in a direction from the first position to the second position. Further, the second engagement member includes an engagement portion at a first end. The engagement portion of the second engagement member is operated to move to a path of the first engagement member when the second engagement member is located at the first position and retracts from the path of the first engagement member when the second engagement member is moved to the second position. Still further, the second engagement member is pivotally moved to the first position in association with a first pivot operation performed by a first operational member for pivotally moving the upper arm from a first pivot position to a second pivot position and retains the upper arm at the second pivot position by an engagement between the engagement portion and the first engagement member. The second engagement member is biased to return to the second position after a completion of the first pivot operation. The tilting mechanism releases a lock of a reclining mechanism for adjusting a position of the upper arm in association with a second pivot operation performed by a second operational member for pivotally moving the upper arm to a third pivot position. The retaining mechanism is provided at the second engagement member for retaining the second engagement member at the first position against a biasing force of the biasing mechanism.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
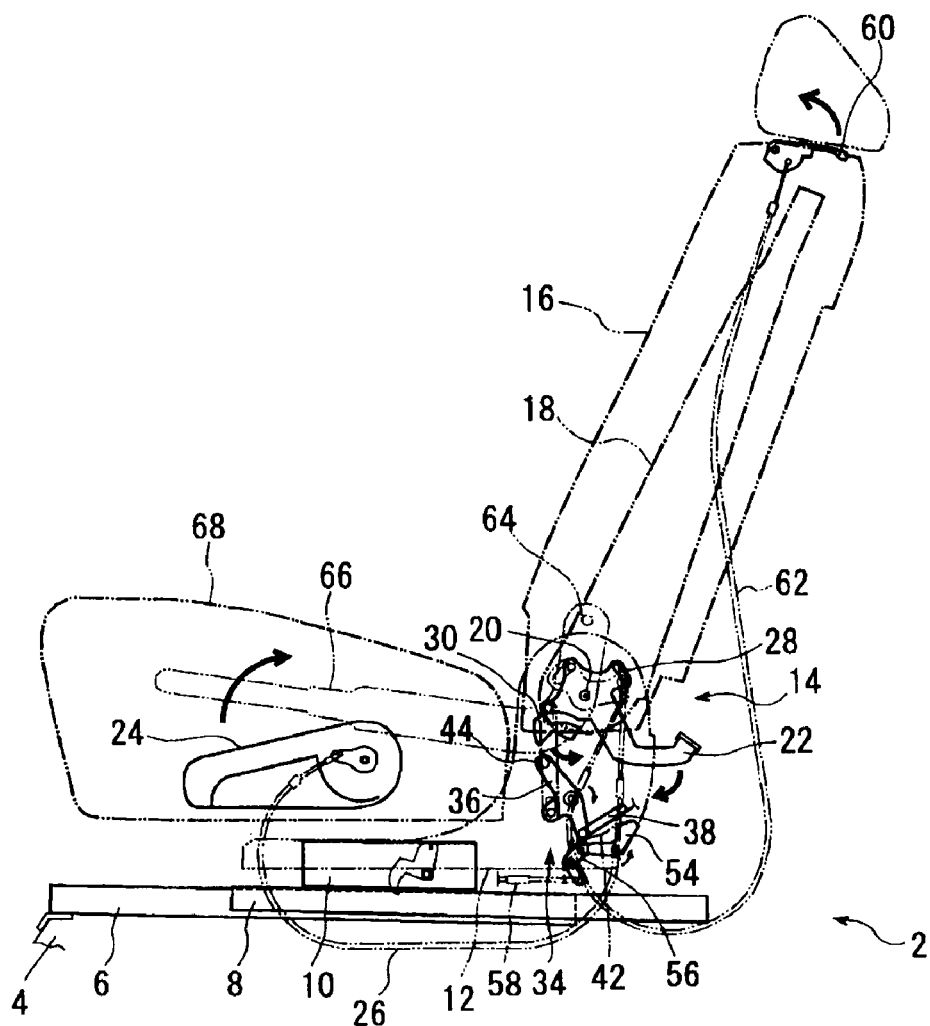
FIG. 1 is an entire schematic view illustrating a seat apparatus for a vehicle.

An embodiment of the present invention will be described hereinafter with reference to the attached drawings. Hereinafter, directions such as longitudinal (front and rear), lateral (right and left) and vertical (upper and lower) correspond to an orientation of the vehicle. As illustrated in FIG. 1, a seat apparatus for a vehicle (hereinafter, referred to as a seat apparatus) 2 is employed for a backside seat of a vehicle such as a van, for example. A pair of lower rails 6 extending in the longitudinal direction of the vehicle is provided on a vehicle floor 4. A pair of upper rails 8 is slidably assembled on the pair of lower rails 6. A relative movement between the lower rails 6 and the upper rails 8 is switched between a locked state and an unlocked state by means of a known slide lock mechanism 10 (hereinafter, the lower rails 6 and the upper rails 8 are referred to as a seat slide apparatus). A lower arm 12 is provided at an upper portion of the upper rails 8 via bracket members and connecting members such as bolts and nuts (not illustrated). The lower arm 12 is employed for supporting a seat cushion 68. Further, an upper arm 18 of a seatback 16 is relatively pivotably assembled at a rear end portion (serving as a first end portion) of the lower arm 12 (more specifically, at a rear upper portion) via a reclining mechanism 14. The reclining mechanism 14 includes a lock mechanism and a forward biasing member. The lock mechanism of the reclining mechanism 14 secures the seatback 16 (upper arm 18) at an arbitral position in a backward pivotal movement of the seatback 16 in a condition where the seatback 16 is located at a position where an occupant can be seated thereon. The forward biasing member of the reclining mechanism 14 biases the upper arm 18 to rotate forwardly about a hinge pin 20 (serving as a rotational shaft). The lock mechanism is a known mechanism, which includes inner teeth and outer teeth (not illustrated) and releases a relative engagement between those teeth by a movement of a cam follower (not illustrated) when a cam member 63 (described in detail below) rotates. Further, a tilting mechanism for forwardly tilting the seatback 16 is structured with the hinge pin 20 and the reclining mechanism 14 (more specifically, the forward biasing member thereof). A base portion of a walk-in pedal 22 (serving as a first operational member) is supported by the hinge pin 20 so as to be rotatable about the hinge pin 20 as a pivotal center. Further, an engagement hole 28 is formed at an outer circumferential portion of the base portion of the walk-in pedal 22. As described below in detail, an end portion of a cable 26 connected at a walk-in lever 24 (serving as the first operational member) provided at the seat cushion 68 is engaged into the engagement hole 28. In cooperation with a forwardly pivotal movement of the upper arm 18 of the seatback 16 to a walk-in position by means of the walk-in pedal 22, the walk-in lever 24 and the cable 26, the slide lock mechanism 10 is operated to unlock the relative movement between the upper rails 8 and the lower rails 6, thus enabling the upper rails 8 to slide relative to the lower rails 6. Herein, the walk-in position is a position where the seatback 16 is forwardly tilted so that an occupant is able to enter (walk to) a backside space of the seatback 16.

An engagement pawl portion 30 (serving as a first engagement member) is provided at a lower end portion of the upper arm 18 so as to rotate (pivot) integrally with the upper arm 18. The engagement pawl portion 30 protrudes downwardly. Further, a stopper unit 34 is provided at a lower side relative to the engagement pawl portion 30. More specifically, the stopper unit 34 is pivotably supported by a first bracket member 32 (see FIG. 5) which is assembled on the lower arm 12.

The stopper unit 34 is structured with a pivotal engagement member 36, a latch member 38, the first bracket 32 assembled on the lower arm 12, a second bracket member 40 assembled on the lower arm 12, and a latch-receiving portion 42 provided at the second bracket member 40. The pivotal engagement member 36 (serving as a second engagement member) is supported by a pivotal center shaft 33 so as to be rotatable (pivotable) about the pivotal center shaft 33 serving as a pivotal center. The pivotal center shaft 33 is provided at the first bracket member 32 so as to be in parallel with the hinge pin 20 provided at the base portion of the walk-in pedal 22. An engagement shaft 44 (serving as an engagement portion) is provided at an upper end portion (serving as a first end portion) of the pivotal engagement member 36 so as to be perpendicular to a pivot plane (imaginary plane) of the pivotal engagement member 36. The engagement shaft 44 is operated to engage with the engagement pawl portion 30. Further, an engagement hole 46 is provided at a lower end portion (serving as a second end portion) of the pivotal engagement member 36, so that a base portion of the latch member 38 is pivotably engaged into the engagement hole 46. The pivotal engagement member 36 is biased by a spring member 37 (serving as a biasing mechanism) in a direction where the engagement shaft 44 is moved to be away from a pivotal path (serving as a path) of the engagement pawl portion 30 (i.e., in a counterclockwise direction in FIGS. 1 and 5). A position where the upper end portion of the pivotal engagement member 36 is separated from the engagement pawl portion 30 by being biased by the spring member 37 is assigned to be a separated position (serving as a second position). A link member 39 is linked at a central end portion of the pivotal engagement member 36. More specifically, one end portion of the link member 39 is linked at an outer circumferential portion of the base portion of the walk-in pedal 22, and another end portion of the link member 39 is linked at the central end portion of the pivotal engagement member 36. The pivotal engagement member 36 is operated to pivot in a direction to reach an engagement position (i.e., in a clockwise direction in FIGS. 1 and 5) by an upward movement of the link member 39. When the pivotal engagement member 36 is located at the engagement position (serving as a first position), the engagement shaft 44 of the pivotal engagement member 36 is located on the pivotal path of the engagement pawl portion 30 so as to be engaged therewith.

Figure 5:
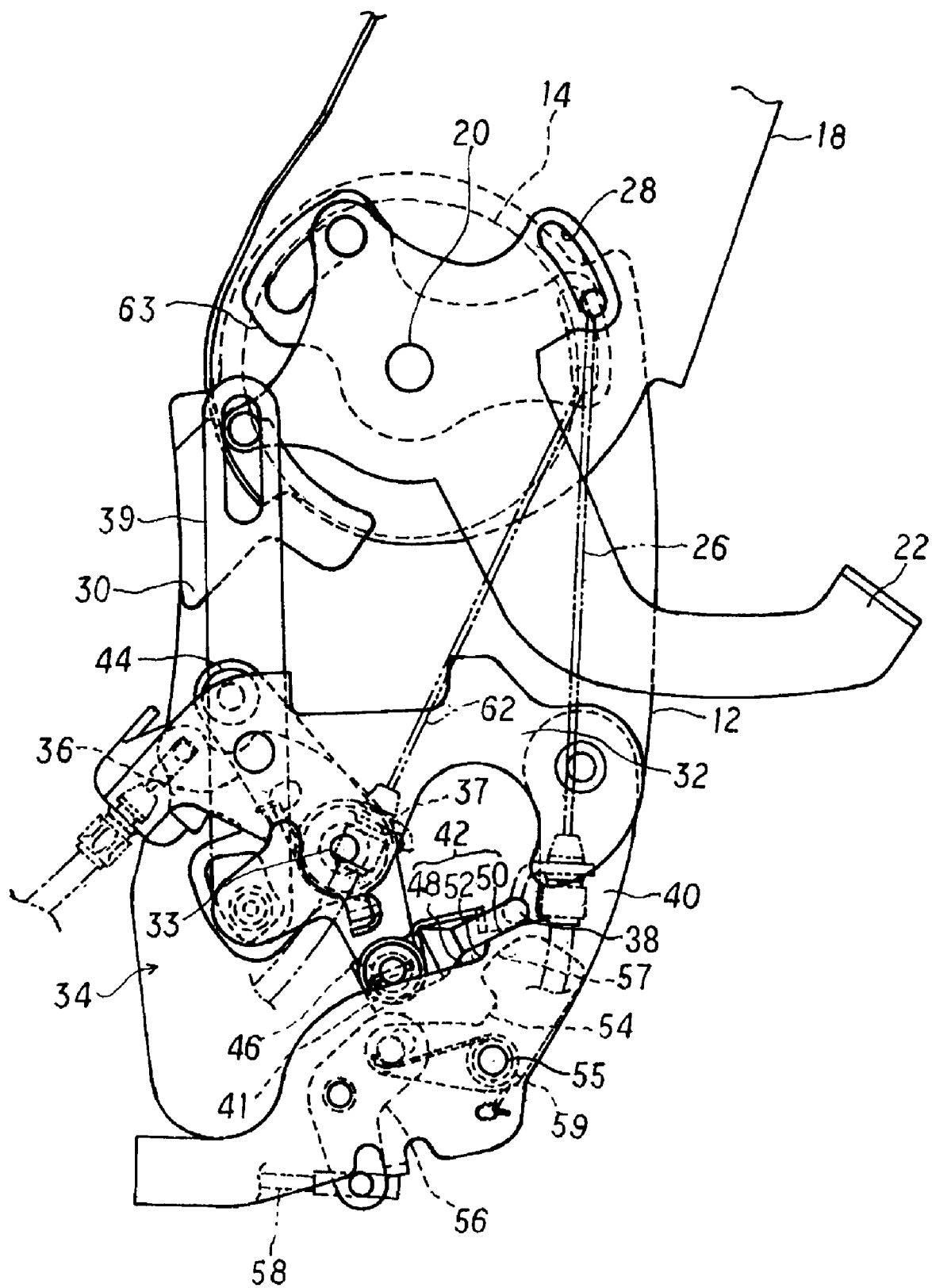
FIG. 5 is an explanatory view illustrating main components of the seat apparatus when the seatback is located at the seating position.

A base end of the latch member 38 is loosely inserted into the engagement hole 46. Further, an end of the latch member 38 is formed in an approximately L-shape by being bent perpendicularly to a pivotal plane (imaginary plane) of the latch member 38. The latch-receiving portion 42 is provided at the second bracket member 40 so as to face the latch member 38. As best shown in FIG. 5, the latch-receiving portion 42 is structured with a first step portion 48, which is formed at a lower portion, and a second step portion 50, which is formed at an upper portion of the latch-receiving portion 42. The end of the latch member 38 is locked at a corner portion 52 (serving as a stepped portion), which is formed between the first and second step portions 48, 50 so as to connect the first and second step portions 48, 50. An end portion of the latch member 38 is pressed to a surface of the latch-receiving portion 42 by a pressing spring member 41. An angle of the corner portion 52 of the latch-receiving portion 42 is formed to be an obtuse angle, so as to generate a force for upwardly pressing the latch member 38 to the second step portion 50 when the latch member 38 receives a force for moving the latch member 38. A lever member 54 is provided at a lower side space of the latch-receiving portion 42. The lever member 54 structures a lever mechanism, which serves as a releasing mechanism and which is included in a retaining mechanism. The lever member 54 is pivotally supported by a pivotal supporting shaft 55 which is provided at the second bracket member 40 so as to be in parallel with the hinge pin 20 of the walk-in pedal 22. An operational portion 57 is provided (formed) at one end portion of the lever member 54. The operational portion 57 is moved towards the corner portion 52 of the latch-receiving portion 42 and is moved to be away from the latch-receiving portion 42. The lever member 54 is moved between an operational position at which the operational portion 57 reaches the corner portion 52 of the latch-receiving portion 42, and a standby portion at which the operational portion 57 is separated from the corner portion 52. Still further, the lever member 54 is biased by a pivotal spring member 59 in a direction where the operational portion 57 is moved away from the corner portion 52. The pivotal spring member 59 is provided at the pivotal supporting shaft 55. When being at the operation position, the operational portion 57 makes contact with the end portion of the latch member 38, which is located at the corner portion 52, so as to press the end portion of the latch member 38 upwardly to the second step portion 50. Another end of the lever member 54 is engaged with one end portion of a pivotal link member 56. Another end portion of the pivotal link member 56 is connected to a second releasing cable 58. The second releasing cable 58 is connected to a tilting operation lever 60 which is provided at an upper end of the seatback 16 and which serves as a second operational member (a description about a connecting manner therebetween is omitted herein). The tilting operation lever 60 is also connected to a first releasing cable 62. The first releasing cable 62 is connected to the cam member 63 of the reclining mechanism 14 so as to release a lock state of the reclining mechanism 14 to forwardly tilt the upper arm 18 of the seatback 16.

Further, a cushion frame 66 is pivotably supported at the upper arm 18 by means of a pivotal center shaft 64 provided at an upper space of the hinge pin 20, i.e., at a lower portion of the upper arm 18. The cushion frame 66 structures a framework of the seat cushion 68. Further, an end portion of the cushion frame 66 is linked to the lower arm 12 by means of a link mechanism (not illustrated), thus supporting the cushion frame 66.

Figure 2:
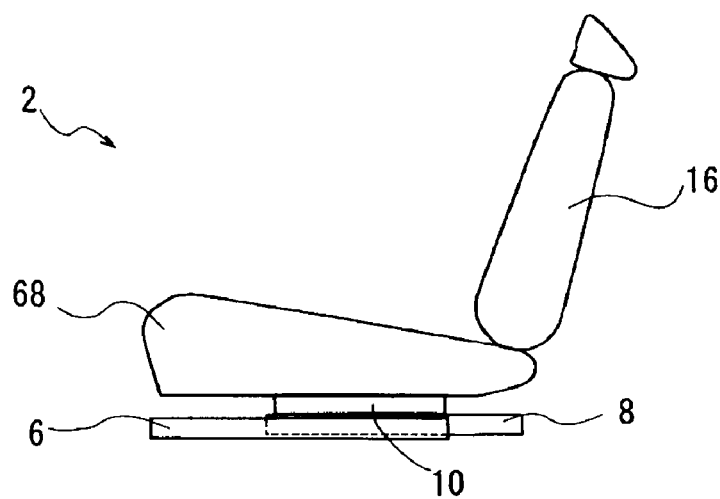
FIG. 2 is a schematic view illustrating a seating position of a seatback at which an occupant is able to be seated.
Figure 3:
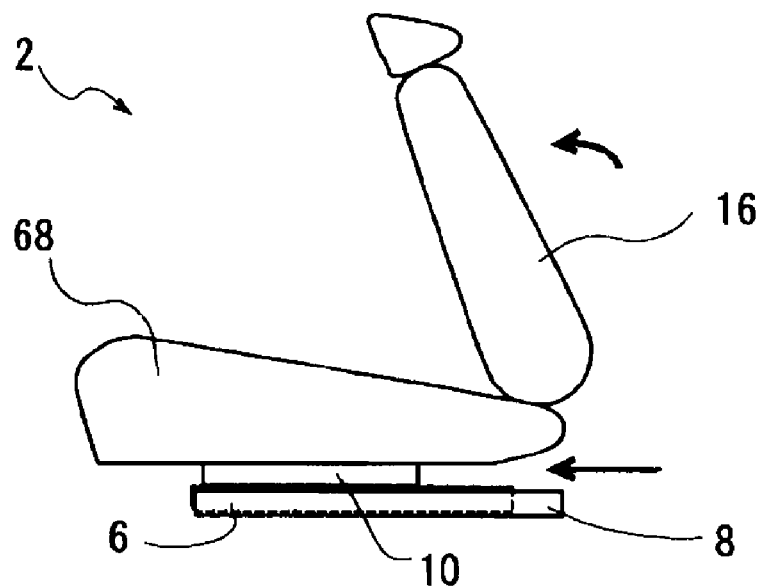
FIG. 3 is a schematic view illustrating a walk-in position of the seatback and a forwardly moved position of an upper rail of a seat slide mechanism.

An operation of the seat apparatus 2 will be described hereinafter with reference to the attached drawings. At a seating position as illustrated in FIG. 2, the seatback 16 is secured at the arbitral position in the backward pivotal movement of the seatback 16 by the reclining mechanism 14. Herein, a position where an occupant can be seated on the seat cushion 68 is assigned to be the seating position (serving as a first pivot position). As is illustrated in FIG. 5 which illustrates a condition where the seat apparatus 2 is located at the seating position, the pivotal engagement member 36 is biased by the spring member 37 and retained at the separated position, at which the upper end portion of the pivotal engagement member 36 is biased by the spring member 37 in the counterclockwise direction. Further, the engagement shaft 44 is located at a position being away from the pivotal path of the engagement pawl portion 30 which pivots in association with the upper arm 18.

Next, when the seat apparatus 2 is located at the walk-in position where an occupant is able to enter (walk to) a backward side of the seatback 16b (to get on a backward seat), the seatback 16 pivots forwardly and is retained at the walk-in position. Further, the upper rails 8 slide relative to the lower rails 6 by the unlock operation of the slide lock mechanism 10, so that the seat cushion 68 slides in the front direction.

Figure 6:
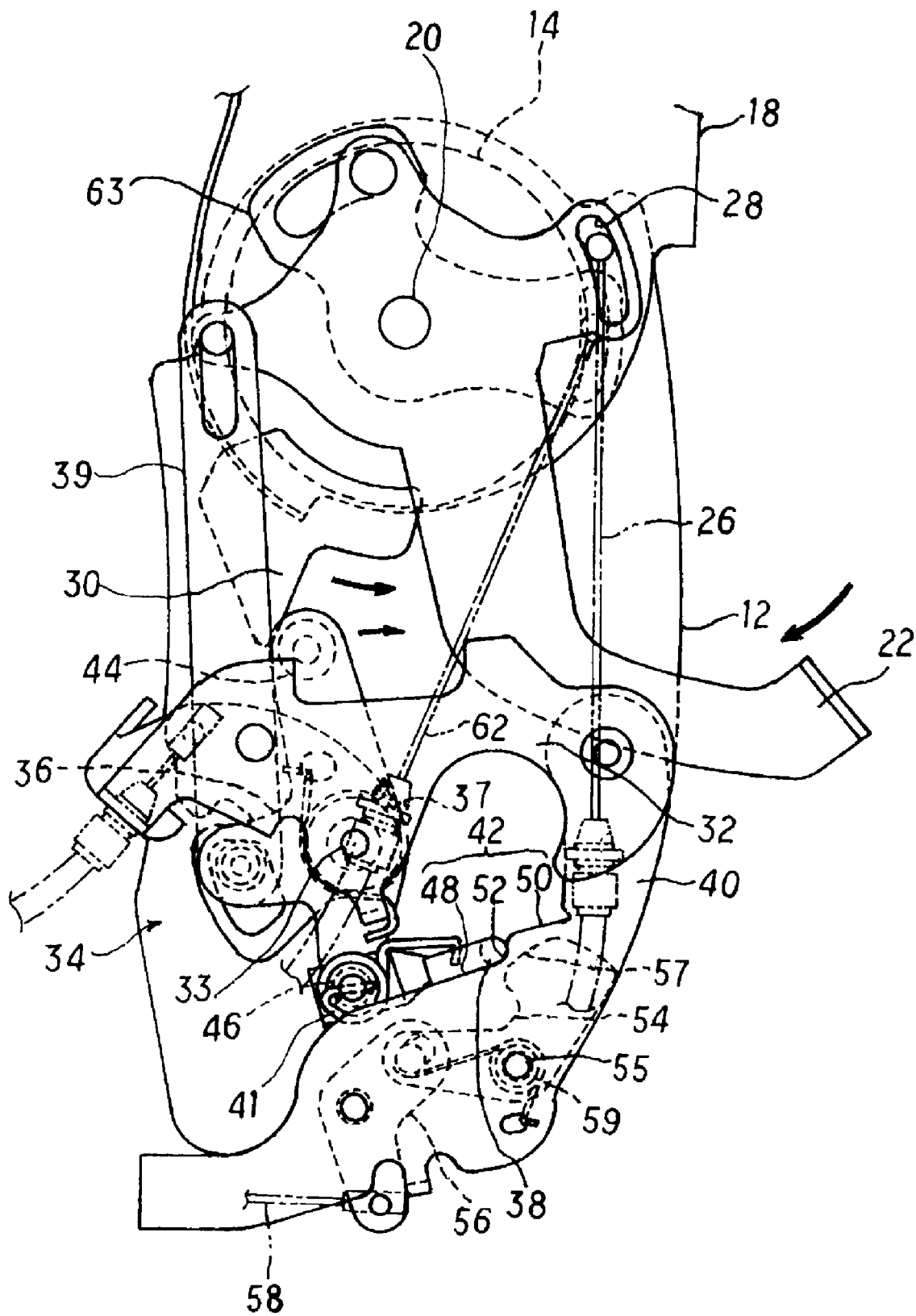
FIG. 6 is an explanatory view illustrating the main components of the seat apparatus when the seatback is located between the seating position and the walk-in position in a pivotal movement towards the walk-in position.
Figure 7:
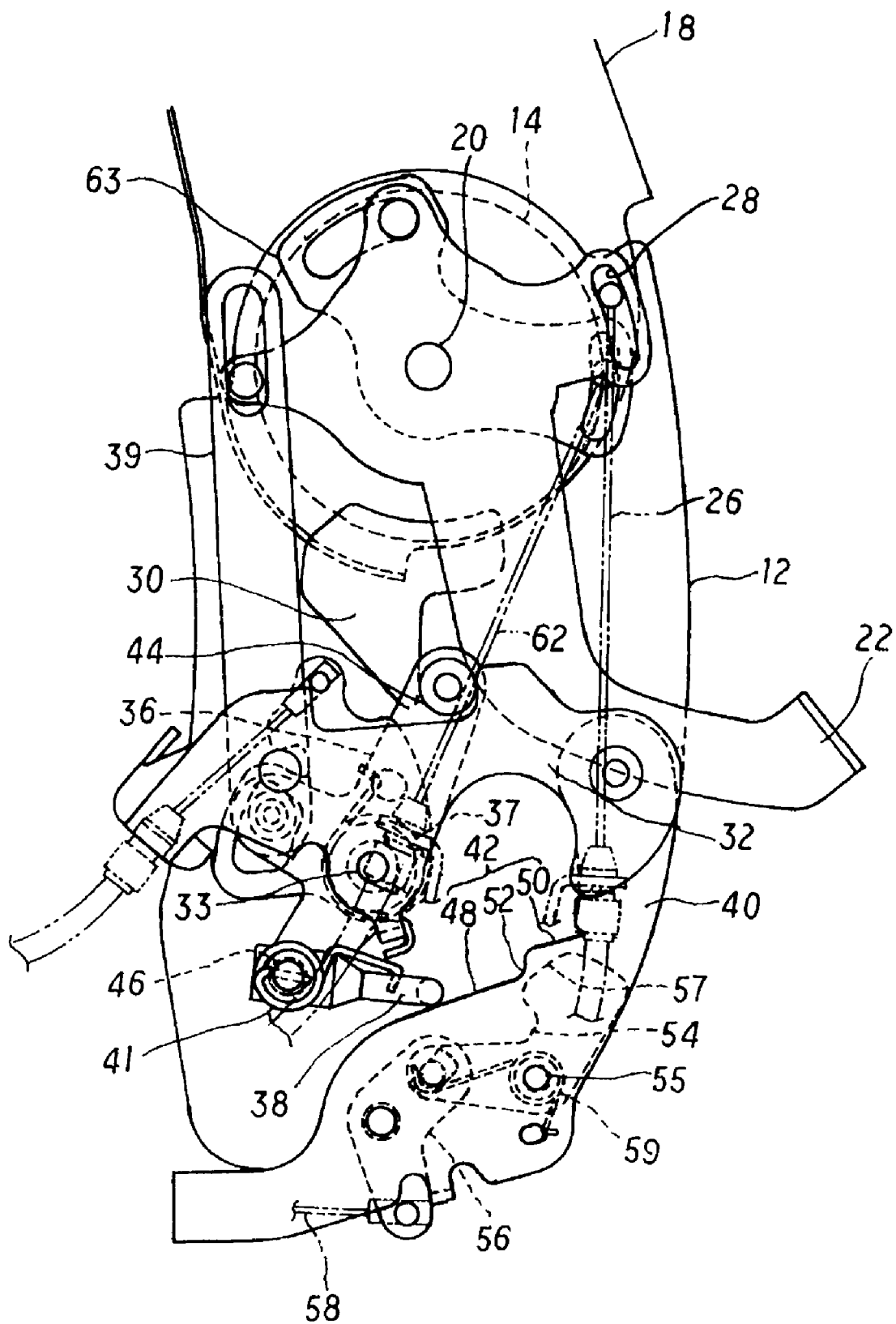
FIG. 7 is an explanatory view illustrating the main components of the seat apparatus when the seatback is located at the walk-in position.

With reference to FIGS. 6 and 7 which illustrate the walk-in position, in order to perform an operation for pivotally moving the seatback 16 to the walk-in position from the seating position (the operation serving as a first pivot operation), at first, the walk-in pedal 22 or the walk-in lever 24 (see FIG. 1) are operated. Hereinafter, the operation of either of the walk-in pedal 22 or the walk-in lever 24 refers to an operation of a walk-in operation member. Then, the cam member 63 linked at the base portion of the walk-in pedal 22 pivots and the lock mechanism of the reclining mechanism 14 is released, thus forwardly pivoting the seatback 16 (the upper arm 18) by means of the forward biasing member of the reclining mechanism 14. Further, the base end portion of the walk-in pedal 22 pivots, so that the pivotal engagement member 36 is operated to pivotally move towards the engagement position via the link member 39 provided at the outer circumferential portion of the base portion of the walk-in pedal 22. Then, the engagement shaft 44 is moved to the pivotal path of the engagement pawl portion 30. Thus, the engagement shaft 44 engages with the engagement pawl portion 30 which is pivoting (see FIG. 6). The engagement shaft 44 further pivotally moves in association with the engagement pawl portion 30 and makes contact with the upper end portion of the first bracket member 32. Thus, the pivotal movement of the engagement pawl portion 30 is locked and the seatback 16 (upper arm 18) is tilted forwardly (see FIG. 7) from the seating position to the walk-in position. In such a state, the latch member 38 is retained at a state where the latch member 38 is pressed upwardly to the first step portion 48 of the latch-receiving portion 42.

However, after operating the walk-in operation member, when the pivotal movement of the upper arm 18 to the walk-in position is stopped before reaching the walk-in position by retaining the seatback 16, for example, even the pivotal engagement member 36 pivotally moves to the engagement position and the engagement shaft 44 is moved to the pivotal path of the engagement pawl portion 30, the engagement shaft 44 of the engagement member 36 does not engage with the engagement pawl portion 30 unless the engagement pawl portion 30 pivotally moves to a position to make contact with the engagement shaft 44. Then, when the walk-in operation member is released (i.e., when an operation of the walk-in operation member is accomplished), the pivotal engagement member 36 returns to the separated position by means of the spring member 37. Accordingly, when the seatback 16 is released from being retained thereby pivoting the upper arm 18, the upper arm 18 is forwardly tilted beyond the walk-in position because the pivotal engagement member 36 is not located at the engagement position.

However, due to the seat apparatus 2 according to the embodiment, even in a condition where the pivotal movement of the upper arm 18 towards the walk-in position is stopped before reaching the walk-in position after the operation of the walk-in operation member, once the walk-in operation member is operated, the latch member 38 is locked at the latch-receiving portion 42 and therefore, the pivotal engagement member 36 is retained at the engagement position against the biasing force of the spring member 37. Thus, even after the completion of the operation of the walk-in operation member, the engagement shaft 44 of the pivotal engagement member 36 is retained at the position to be engaged with the engagement pawl portion 30 without retracting from the pivotal path of the engagement pawl portion 30. Then, the engagement pawl portion 30 pivotally moving in association with the movement of the upper arm 18 towards the walk-in position is engaged with the engagement shaft 44 of the pivotal engagement member 36. Therefore, the seatback 16 (the upper arm 18) is prevented from being further pivotally moved to a tilt-down position (folded position) beyond the walk-in position (see FIG. 6). Thus, a malfunction, in which the seatback 16 intended to be stopped at the walk-in position is further pivotally moved to the tilt-down position, is prevented by the latch member 38 and the latch-receiving portion 42, thereby enabling an operator to pivotally move the seatback 16 safely and surely. Thus, the latch member 38 and the latch-receiving portion 42 serve as the retaining mechanism for retaining the pivotal engagement member 36 at the engagement position against the biasing force of the spring member 37.

Figure 4:
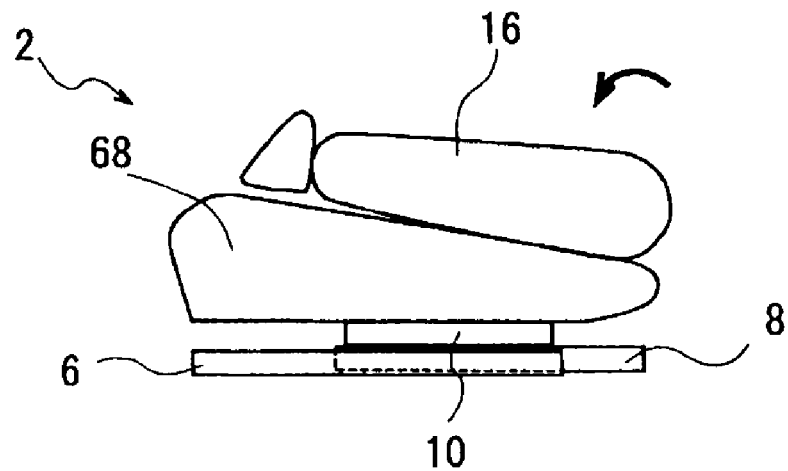
FIG. 4 is a schematic view illustrating a tilt-down position of the seatback.

As illustrated in FIG. 4, at the tilt-down position (serving as a third pivot position), the seatback 16 is forwardly tilted towards a front end portion (second end portion) of the lower arm 12 so as to be approximately horizontal without forwardly slidably moving the upper rails 8 of the seat slide apparatus so that a lot of objects (such as luggage) can be placed on a back surface of the folded seatback 16. Hereinafter, an operation for pivoting the seatback 16 to the tilt-down position (serving as a second pivot operation) will be described. More specifically, in the operation described herein, the seatback 16 is temporally returned to the seating position after a completion of the operation for moving the seatback from the seating position to the walk-in operation by means of the walk-in operation member, and then, the seatback 16 is further forwardly pivotally moved to the tilt-down position by means of the tilting operation lever 60. As described above, when the walk-in operation is performed by the walk-in operation member, the pivotal engagement member 36 is pivotally moved to the engagement position and the latch member 38 is locked by the latch-receiving portion 42. Therefore, when performing the operation for returning the upper arm 18 to the seating position, the pivotal engagement member 36 is still retained at the engagement position. However, by operating the tilting operation lever 60 (see FIG. 1), the pivotal engagement member 36 retained at the engagement position is released from the retained state and is accordingly returned to the separated position in cooperation with the lever member 54 serving as the releasing mechanism.

Figure 8:
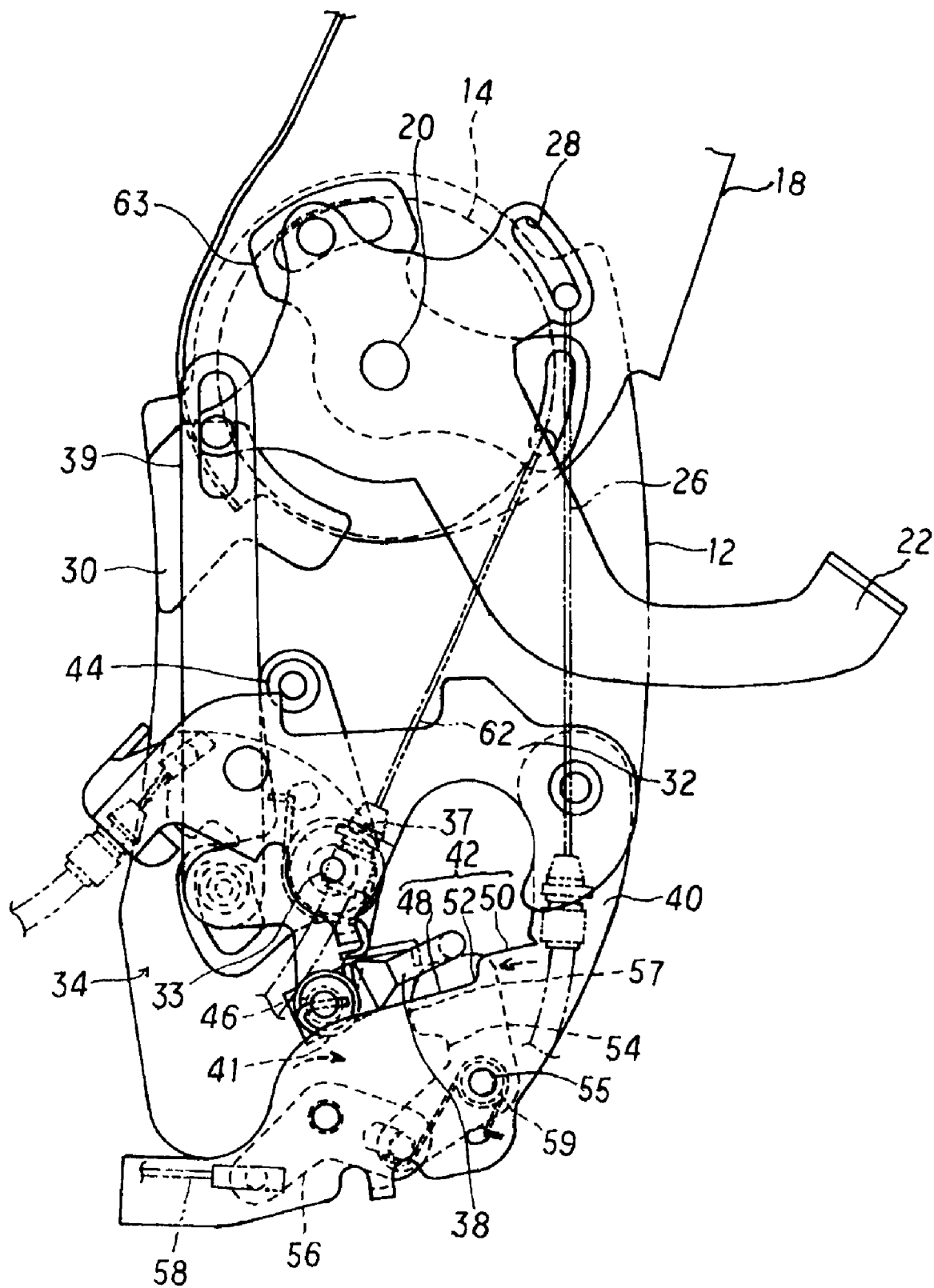
FIG. 8 is an explanatory view illustrating the main components of the seat apparatus when the seatback is located between the walk-in position and the tilt-down position in a pivotal movement towards the tilt-down position.
Figure 9:
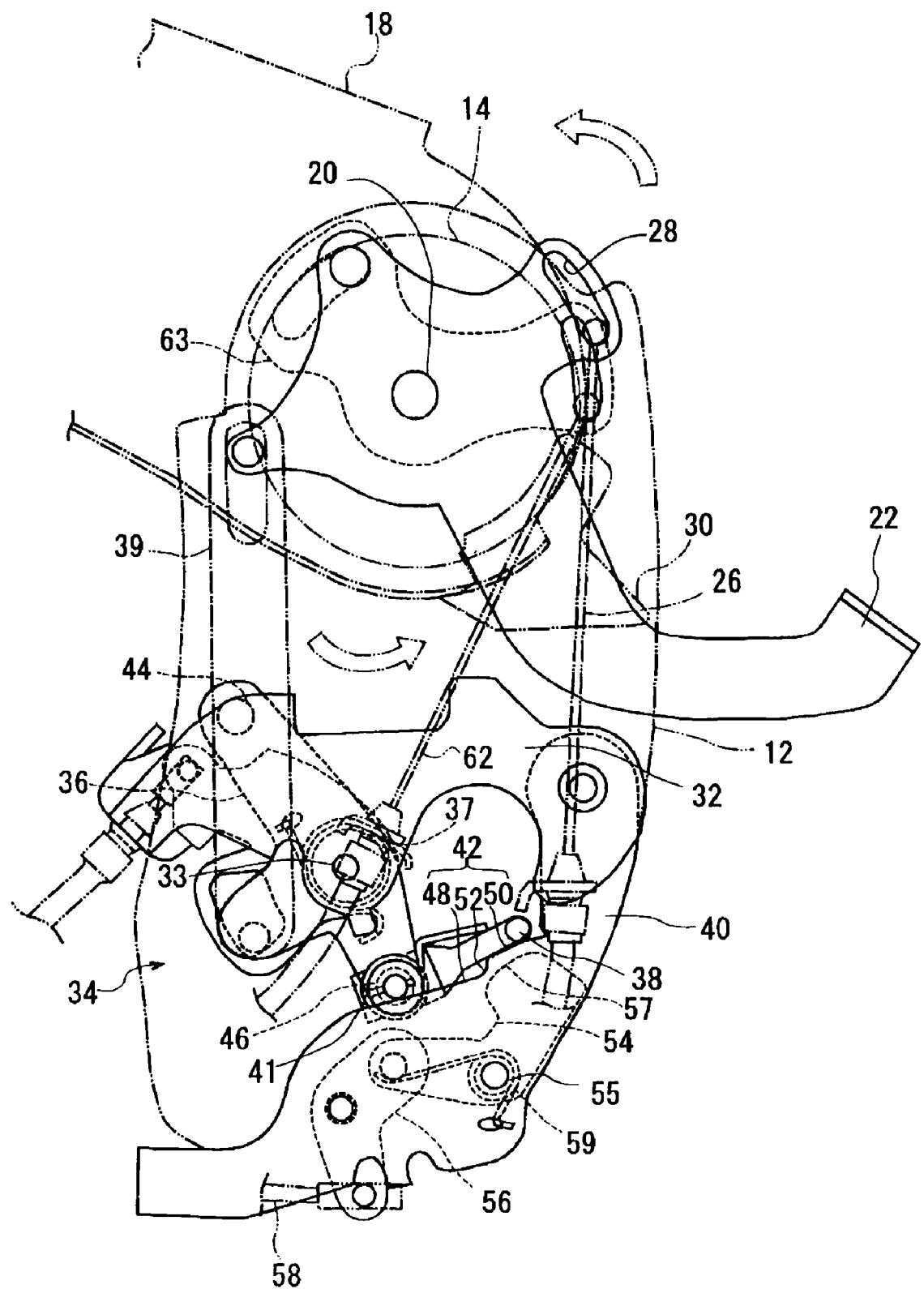
FIG. 9 is an explanatory view illustrating the main components of the seat apparatus when the seatback is located at the tilt-down position.

More specifically, by operating the tilting operation lever 60, the first releasing cable 62 and the second releasing cable 58 are pulled (see FIG. 8). The pivotal link member 56 is operated to pivot by the pulling of the second releasing cable 58, and the operational portion 57 of the lever member 54 is moved to the corner portion 52 of the latch-receiving portion 42 so as to contact the latch member 38. Then, the end of the latch member 38 is pressed upwardly from the first step portion 48 to the second step portion 50, thereby releasing the locked state of the latch member 38. Accordingly, the pivotal engagement member 36 pivotally moves to the separated position. Further, because the engagement shaft 44 is not engaged with the engagement pawl portion 30, the seatback 16 (upper arm 18) pivotally moves to the tilt-down position so as to be horizontal beyond the walk-in position (see FIG. 9). Thus, even when the tilting operation of the seatback 16 (the upper arm 18) is performed by means of the tilting operation lever 60 after the completion of the walk-in operation by means of the walk-in operation member, the upper arm 18 (the seatback 16) is operated to smoothly pivotally move to the tilt-down position.

Figure 10:
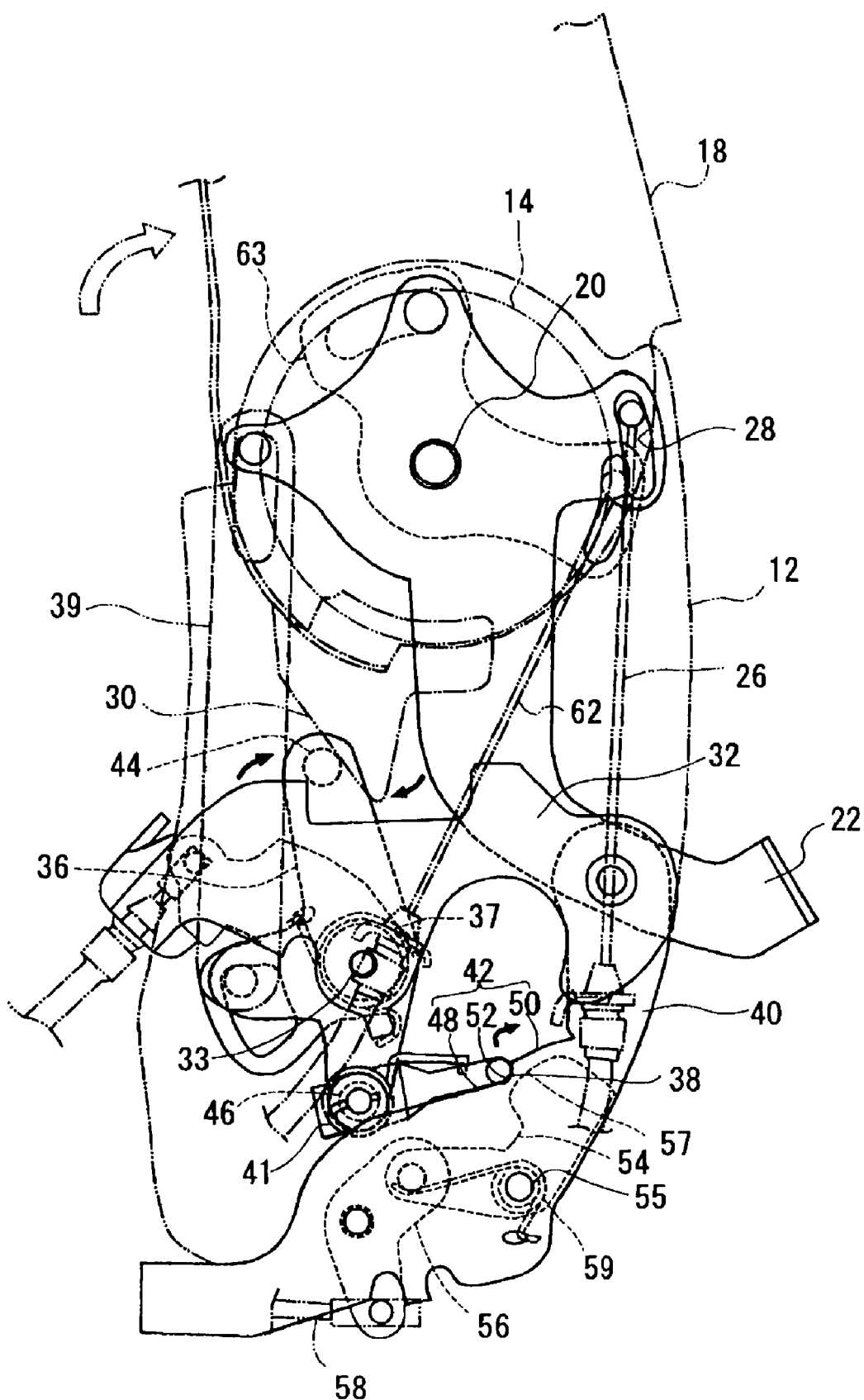
FIG. 10 is an explanatory view illustrating the main components of the seat apparatus when the seatback is located between the tilt-down position and the seating position in a backwardly reclining movement towards the seating position.

Next, a condition where the walk-in pedal members are operated before the seatback 16 is raised backwardly when the seatback 16 is located at the tilt-down position will be described hereinafter. First, the latch member 38 and the latch-receiving portion 42 (both which serve as the retaining mechanism) are locked by the operation of the walk-in operation member (see FIG. 10). Therefore, the pivotal engagement member 36 is retained at the engagement position, and the engagement shaft 44 is moved to the pivotal path of the engagement pawl portion 30. Then, the engagement pawl portion 30 pivoting in accordance with the backward pivoting movement of the seatback 16 (the upper arm 18) makes contact with the engagement shaft 44 by pivoting in an inverted direction (i.e., in a clockwise direction in FIG. 10), thereby pressing the engagement shaft 44. When the engagement shaft 44 is pressed, the pivotal engagement member 36 is operated to pivot in a counterclockwise direction in FIG. 10 so as to press the latch member 38 to the latch-receiving portion 42. Herein, because the corner portion 52 of the latch-receiving portion 42 is formed in the obtuse angle, when a force being equal to or larger than a predetermined value is applied to the corner portion 52 of the latch-receiving portion 42 from the latch member 38, the latch member 38 is pressed upwardly by receiving a counterforce acting upwardly from the latch member 38. Therefore, the latch member 38 is moved beyond the corner portion 52 of the latch-receiving portion 42 and the engagement between the latch member 38 and the latch-receiving portion 42 is released. Accordingly, the pivotal engagement member 36 pivotally moves to the separated position and the seatback 16 (the upper arm 18) pivots (rotates) backwardly, thus smoothly returning the seatback 16 to the seating position.

Further, when the engagement shaft 44 of the pivotal engagement member 36 receives a force which is equal to or greater than a predetermined value from the engagement pawl portion 30 in the direction towards the separated position, the latch member 38 is released from the engagement with the latch-receiving portion 42 beyond the corner portion 52. Therefore, the pivotal engagement member 36 is allowed to move to the separated position, so that the upper arm 18 (seatback 16) is moved to the seating position. Accordingly, even in a condition where an operator intends to backwardly pivotally move the seatback 16 from the tilt-down position towards the seating position without performing an operation for releasing the retained state of the pivotal engagement member 36 located at the engagement position, the pivotal engagement member 36 is returned to the separated position in accordance with a backwardly pivotal movement of the upper arm 18, thus smoothly backwardly tilting the seatback 16 towards the seating position.

Further, according to the embodiment, the latch member 38 is engaged with the latch-receiving portion 42 at the corner portion 52, at which the steps (first and second step portions 48, 52) are generated. With such simple structure of the retaining mechanism, the pivotal engagement member 38 is retained at the engagement position, and the upper arm 18 (the seatback 16) is retained at the walk-in position.

Still further, the engagement between the latch member 38 and the latch-receiving portion 42 is released by upwardly pressing the latch member 38 by means of the lever member 54 pivotally moved between the operational position and the standby position. With such simple structure of the lever member 54, the retained state of the pivotal engagement member 36 located at the engagement position is released so as to return the pivotal engagement member 36 to the separated position, thus forwardly tilting the upper arm 18.

According to the embodiment described above, the latch member 38 and the latch-receiving portion 42 for locking the latch member 38 serve as the retaining mechanism. However, the present invention is not limited to the embodiment described above. For example, a detent wheel for locking the lower end portion (second end portion) of the pivotal engagement member 36 may serve as the retaining mechanism. In such a state, the pivotal engagement member 36 is released from the locked state at the engagement position by a rotation of the detent wheel in a direction to release the locked state of the pivotal engagement member 36. Further, any other known arts may be adapted.

Still further, the lever mechanism 54 serves as the releasing mechanism for releasing the engagement between the pivotal engagement member 36 located at the engagement position and the engagement pawl portion 30. However, the present invention is not limited to the embodiment described above. For example, in a state where the detent wheel is provided, the detent wheel may rotate when a load applied thereto is equal to or greater than the predetermined value for releasing the engagement position.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle, comprising
   a slide lock mechanism that locks and unlocks a relative movement between a lower rail adapted to be mounted on a vehicle to extend in a longitudinal direction of the vehicle and an upper rail slidably mounted on the lower rail;
   a first engagement member provided at a lower end portion of an upper arm pivotably supported by a first end portion of a lower arm operatively connected to the upper rail to slide in association with the upper rail, the lower arm supporting a seat cushion;
   a second engagement member supported by the lower arm to be pivotally moved between a first position at which the first engagement member and the second engagement member are engaged with each other and a second position at which the second engagement member is separated from the first engagement member, the second engagement member biased by a biasing mechanism in a direction from the first position to the second position, the second engagement member including an engagement portion at a first end, the engagement portion of the second engagement member moving to a path of the first engagement member when the second engagement member is located at the first position and retracting from the path of the first engagement member when the second engagement member is moved to the second position, the second engagement member pivotally moved to the first position in association with a first pivot operation performed by a first operational member for pivotally moving the upper arm from a first pivot position to a second pivot position and retaining the upper arm at the second pivot position by an engagement between the engagement portion and the first engagement member, the second engagement member biased to return to the second position after a completion of the first pivot operation;
   a tilting mechanism releasing a lock of a reclining mechanism for adjusting a position of the upper arm in association with a second pivot operation performed by a second operational member for pivotally moving the upper arm to a third pivot position; and
   a retaining mechanism provided at the second engagement member for retaining the second engagement member at the first position against a biasing force of the biasing mechanism.

2. A seat apparatus for a vehicle according to claim 1, wherein
   the first pivot position of the upper arm includes a position at which an occupant is to be seated on the seat cushion,
   the second pivot position of the upper arm includes a position at which the upper arm is tilted between the first pivot position and the third pivot position, and
   the third pivot position of the upper arm includes a position at which the upper arm is tilted towards a second end portion of the lower arm to be substantially horizontal.

3. A seat apparatus for a vehicle according to claim 2, wherein
   a releasing mechanism is moved between an operational position at which the releasing mechanism is moved to reach a latch-receiving portion in cooperation with the second pivot operation of the second operational member, and a standby position at which the releasing mechanism is separated from the latch-receiving portion, and
   the releasing mechanism includes a lever mechanism for releasing an engagement between the latch member and the latch-receiving portion by upwardly pressing the latch member so that the latch member is moved beyond a stepped portion of the latch-receiving portion to release the engagement between the latch member and the latch-receiving portion when the releasing mechanism is located at the operational position.

4. A seat apparatus for a vehicle according to claim 1, wherein the retaining mechanism includes:
   a latch member provided at a second end portion of the second engagement member; and a latch-receiving portion provided at the lower arm and including a stepped portion, the latch-receiving portion engaging with the latch member at the stepped portion to restrain a pivotal movement of the second engagement member to the second position by the biasing mechanism.

5. A seat apparatus for a vehicle according to claim 4, wherein the latch member and the latch-receiving portion are disengaged from each other when an engagement between the latch member and the stepped portion is released in a state in which the first engagement member makes contact with the engagement portion of the second engagement member by a pivotal movement of the upper arm in a direction from the third pivot position to the first pivot position.

6. A seat apparatus for a vehicle according to claim 1, wherein the retaining mechanism includes a releasing mechanism for releasing the second engagement member retained at the first position in association with the second pivot operation performed by the second operational member.

7. A seat apparatus for a vehicle according to claim 1, wherein the tilting mechanism includes a hinge pin about which the upper arm pivots, the first operational member includes a walk-in pedal and a walk-in lever provided at the seat cushion, the walk-in pedal is supported by the hinge pin to rotate about the hinge pin, an engagement hole is formed at an outer circumferential portion of the walk-in pedal, and an end portion of a cable connected to the walk-in lever is engaged with the engagement hole of the walk-in pedal.

* * * * *